Aug. 26, 1941.   L. B. SMITH   2,253,735
METHOD OF MAKING DRILL JARS
Filed March 6, 1939   2 Sheets-Sheet 1
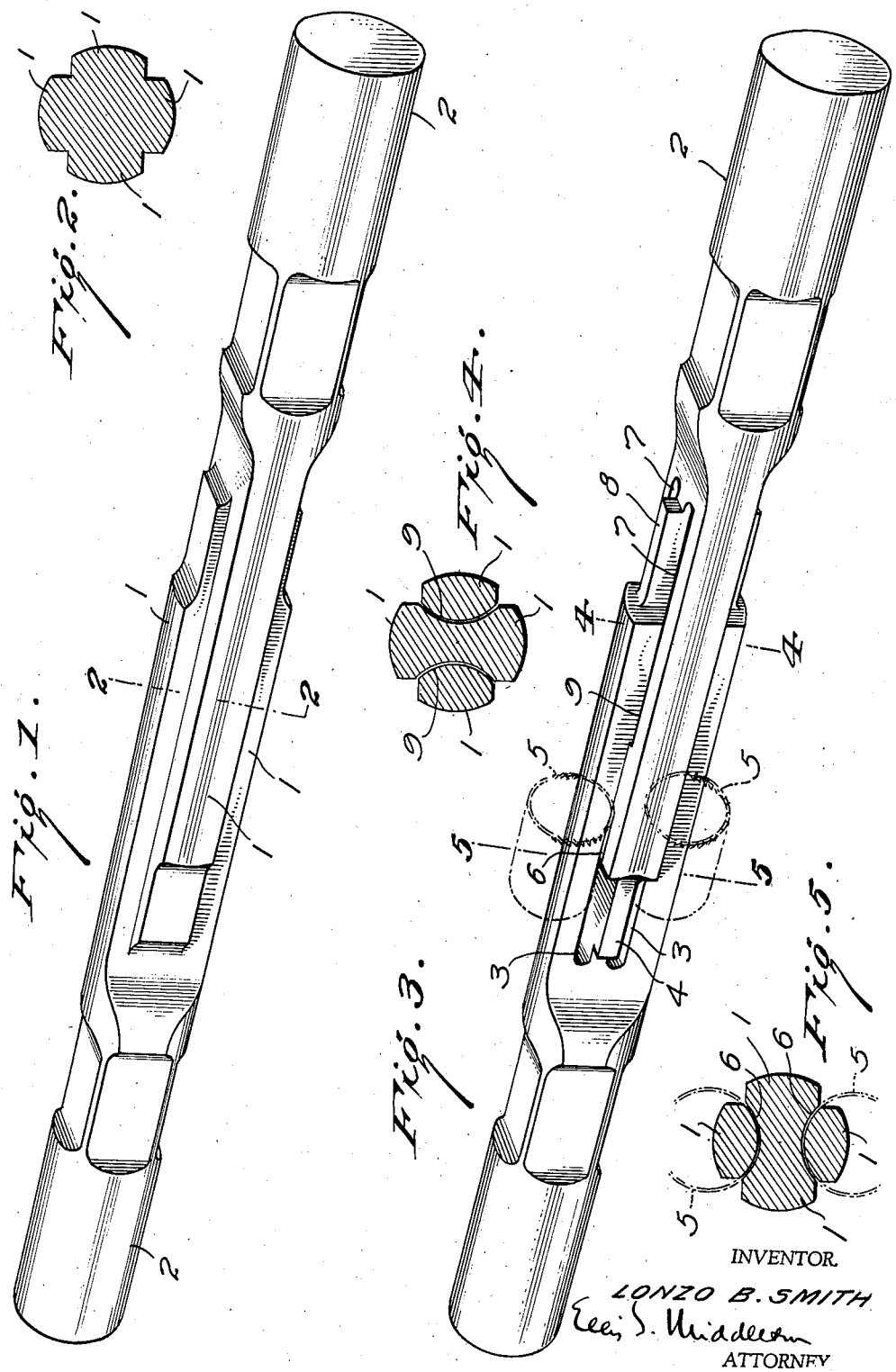
INVENTOR.
LONZO B. SMITH
ATTORNEY

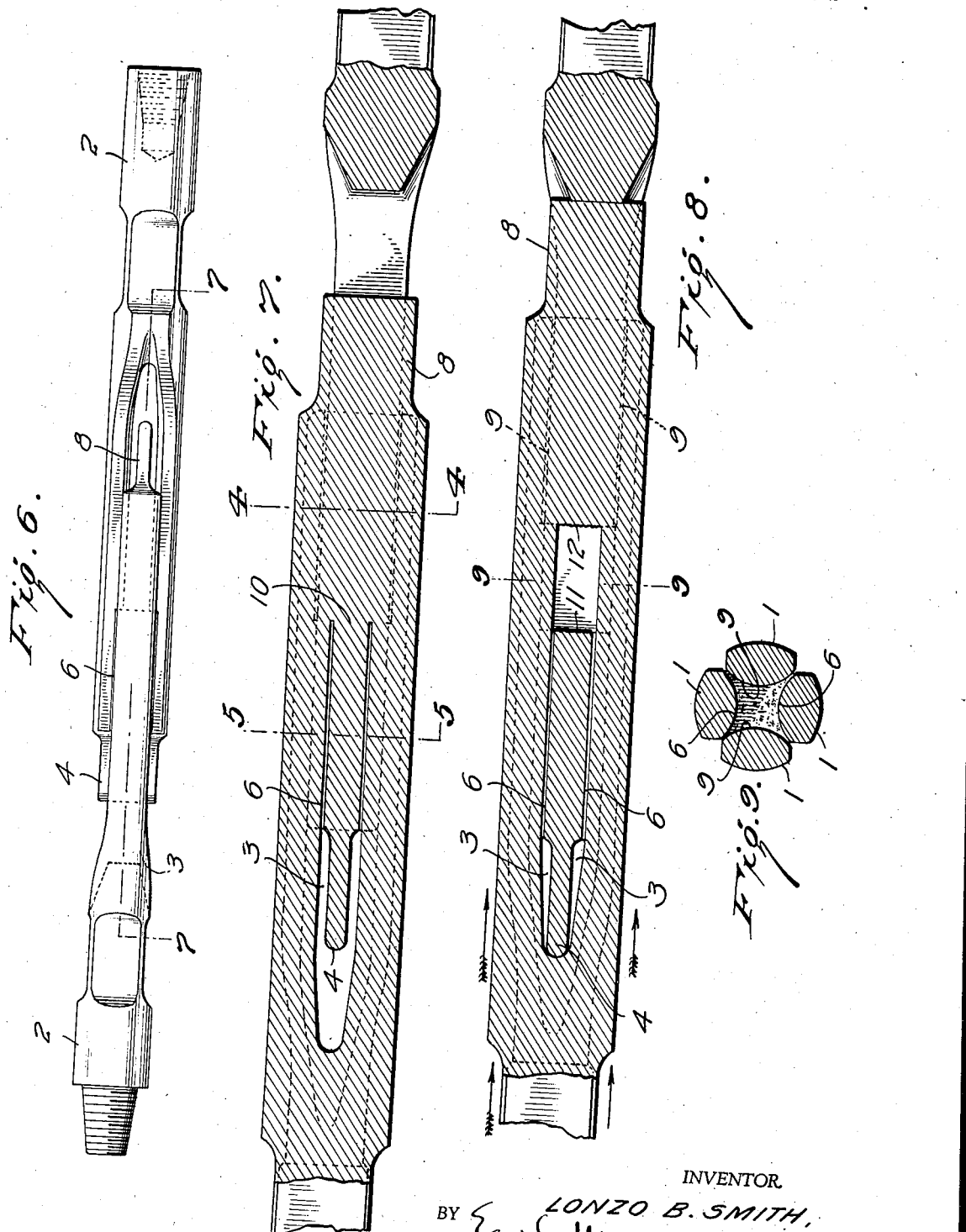

Patented Aug. 26, 1941

2,253,735

UNITED STATES PATENT OFFICE 2,253,735

METHOD OF MAKING DRILL JARS

Lonzo B. Smith, Parkersburg, W. Va., assignor to Acme Fishing Tool Company, Parkersburg, W. Va., a corporation of West Virginia Application March 6, 1939, Serial No. 259,962

6 Claims. (Cl. 76—101)

The present invention relates to methods of making well jars made from a single bar of metal stock without welding, deforming or upsetting operations.

Jars made from a single bar of stock are known but such tools have heretofore required upsetting or deforming operations due to the fact that in order to cut or remove the metal from between the links, such links had to be formed with a larger space between their reins than was desired. Following the metal removal operation from the center of the links, and to separate the links, opposite reins of each link were deformed in a direction toward each other. This has the effect of closing the link or reducing its initial width to that desired. As a consequence, a bar of stock was required having a width at its link-forming section equal to that of the initially formed link. As the links were ultimately to be of less width, the rest of the bar had to be cut away with consequent waste and loss. Moreover, the final deformation or upsetting operation to reduce the link width causes a residual strain in the metal so that failures frequently occur at these points.

It is the principal object of the invention, therefore, to construct a well jar from a single bar of stock where no upsetting or deformation of the links is necessary. That is, both links are integrally formed in the interlocked position and in final width. Such a jar may consequently be made from stock of less width or diameter, entails practically no waste, and does not set up strains or stresses in the metal which might subsequently result in tool failure.

The above and other desirable objects are accomplished by forming substantially parallel slots through the stock to define the eventual tongue and then inserting in such openings, arcuate cutters and kerfing arcuate slots in the stock, one surface of each slot forming the inner surface of the reins of one link. Similar tongue slots are then formed in the other end portion of the bar at 90° to those initially formed and similar arcuate kerfs cut in a direction toward those first mentioned, until the two sets of kerfs meet in substantially a single transverse plane.

While the parts are thus still integrally joined, the usual machine finishing and heat treatment is performed. Finally, the parts are separated as by flexing, which breaks the main body between the links along the line of the transverse plane above mentioned. The two adjacent sections of metal thus separated form the knocking heads. The reins of the opposite links thus fit together without further machining or deformation and are of substantially the same diameter as that of the stock used.

The invention further includes the novel steps of the method more fully hereinafter described and shown in the drawings, in which—

Fig. 1 is a perspective of a partially shaped bar of round stock ready for the kerfing operation;

Fig. 2 is a sectional view along the line 2—2 of Fig. 1;

Fig. 3 is a perspective view showing one set of kerfs finished and the opposite set in the course of formation;

Fig. 4 is a sectional view along the line 4—4 of Fig. 3;

Fig. 5 is a sectional view along the line 5—5 of Fig. 3;

Fig. 6 is a plan view of the jar after the finish of the machine finishing and heat treating operation and before breaking apart;

Fig. 7 is a sectional view along the line 7—7 of Fig. 6;

Fig. 8 is a similar view after the knocking heads have been broken apart and separated;

Fig. 9 is a sectional view along the line 9—9 of Fig. 8.

Referring now to the specific embodiment illustrated, a typical round bar of steel stock is worked by known means into the shape shown in Fig. 1. It is to be noted that the extreme diameter of mid-section 1 which defines the link width is the same as that of the round stock originally used and the same as that of the, at this point, unfinished ends 2 thereof.

Slots 3 are now cut through the bar to form in rough shape the eventual tongue 4, leaving however the tongue still attached integrally to the bar proper. Arcuate cutters 5 are now inserted through the slots 3 and oscillated about their axes to form two kerfs 6 (see also Fig. 5). In Fig. 3, the cutters 5 are shown diagrammatically progressing toward the opposite end of the bar. This figure shows the right hand end of the bar as having already formed therein tongue slots 7 defining tongue 8 and the end of one kerf 9, the rest of which is shown in Fig. 4.

It is to be noted that these two pairs of kerfs extend toward each other until they meet in substantially a single plane transverse to the bar proper. This relationship is shown in Figs. 6 and 7. It is to be noted that, while the bar stock is still one integral piece, yet two links have been formed with their reins shaped to each other without deformation or working but simply by cutting them apart with minimum space therebetween. They are still joined together by what will eventually be the knocking heads.

At this stage, the machine operations are concluded including completion of the tongue and tongue slots and threading of the ends of the bar by which the jar may be attached to other members of the tool string, as well as heat treating. Due to the fact that the links are still connected together at their knocking heads, the parts are maintained in axial alignment during the machining operations, thus preventing inaccuracies.

The jar links may be finally separated or parted by flexing, which causes a break at the point 10 (Fig. 7). This is the area in the plane including the ends of the pairs of kerfs 6 and 9 and shown in Fig. 9. The links may now be separated as in Fig. 8. The faces of the segment thus broken form the contact areas 11 and 12 of the knocking heads.

While the invention has been shown and described with particular reference to specific embodiments, yet it is to be understood that it is not to be limited thereto but is to be construed broadly and restricted only by the scope of the claims.

I claim:

1. A method of forming a well jar having links integrally joined together which includes making a pair of slots in one end portion of a bar of stock, arcuately kerfing the bar from each slot toward the opposite end of the bar, similarly treating the other end portion of the bar to form slots and kerfs substantially at 90° from those above mentioned and severing the section between the four kerfs in substantially the plane including the ends of the kerfs.

2. The method of claim 1 in which one surface of each kerf forms a portion of the inner surface of a rein of one link.

3. The method of claim 1 in which the links are cut from the bar stock at substantially their eventual width.

4. A method of forming a well jar having links integrally joined together which includes making a pair of slots in one end portion of a bar of stock, arcuately kerfing the bar from each slot toward the opposite end of the bar, similarly treating the other end portion of the bar to form slots and kerfs substantially at 90° from those above mentioned, forming tongues from the metal between pairs of slots and tongue seats at the ends of the slots, machine finishing and heat treating the tool while the links are joined together and then severing the joined parts of the links to form knocking heads.

5. The method of claim 1 in which the severed sections form knocking heads.

6. A method of forming a well jar having links integrally joined together which includes making two kerfs in one end portion of a bar in an axial direction to form the reins of a link, making two kerfs in the other end portion of the bar substantially at right angles to the first kerfs and in an opposite axial direction to form the reins of a second link, the ends of the four kerfs being in substantially a plane transverse to the bar, forming tongues from the metal between pairs of kerfs and tongue seats between the ends of each pair of kerfs, heat treating the two while the links are joined together to produce a brittle section capable of being fractured upon bending, and severing by bending, the joined pair of links in the thus formed brittle section and in substantially the plane including the ends of all four kerfs to form knocking heads.

LONZO B. SMITH.